(12) United States Patent
Kovtun et al.

(10) Patent No.: US 8,315,430 B2
(45) Date of Patent: Nov. 20, 2012

(54) OBJECT RECOGNITION AND DATABASE POPULATION FOR VIDEO INDEXING

(75) Inventors: Ivan Kovtun, Kyiv (UA); Oleksandr Zhukov, Kyiv (UA); Yuriy Musatenko, Kyiv (UA); Mykhailo Schlesinger, Kiev (UA)

(73) Assignee: Viewdle Inc., Palo Alto, CA (US)

( * ) Notice: Subject to any disclaimer, the term of this patent is extended or adjusted under 35 U.S.C. 154(b) by 1046 days.

(21) Appl. No.: 11/949,258

(22) Filed: Dec. 3, 2007

(65) Prior Publication Data

US 2009/0141988 A1  Jun. 4, 2009

Related U.S. Application Data

(60) Provisional application No. 60/986,236, filed on Nov. 7, 2007.

(51) Int. Cl.
*G06K 9/00* (2006.01)
(52) U.S. Cl. ......................... 382/103; 382/118
(58) Field of Classification Search .................. 382/100, 382/118
See application file for complete search history.

(56) References Cited

U.S. PATENT DOCUMENTS

| | | | |
|---|---|---|---|
| 6,594,751 B1 * | 7/2003 | Leivent | 711/209 |
| 6,754,389 B1 | 6/2004 | Dimitrova et al. | |
| 2001/0035907 A1 | 11/2001 | Broemmelsiek | |
| 2003/0161500 A1 * | 8/2003 | Blake et al. | 382/103 |
| 2003/0197779 A1 * | 10/2003 | Zhang et al. | 348/14.16 |
| 2003/0218672 A1 * | 11/2003 | Zhang et al. | 348/14.16 |
| 2004/0017933 A1 | 1/2004 | Lestideau | |
| 2004/0223631 A1 | 11/2004 | Waupotitsch et al. | |
| 2006/0155398 A1 * | 7/2006 | Hoffberg et al. | 700/86 |
| 2006/0165258 A1 | 7/2006 | Avidan | |
| 2006/0200260 A1 * | 9/2006 | Hoffberg et al. | 700/86 |

OTHER PUBLICATIONS

"International Application Serial No. PCT/US2008/12502 Search Report mailed Jan. 9, 2009".
"International Application Serial No. PCT/US2008/12502 Written Opinion mailed Jan. 9, 2009".
Viola, P. et al., "Robust Real-Time Object Detection," Second International Workshop on Statistical and Computational Theories of Vision—Modeling, Learning, Computing, and Sampling, Vancouver, Canada, Jul. 13, 2001, pp. 1-25.

* cited by examiner

*Primary Examiner* — Hadi Akhavannik

(57) ABSTRACT

A method for processing digital media is described. The method, in one example embodiment, includes identification of objects in a video stream by detecting, for each video frame, an object in the video frame and selectively associating the object with an object cluster. The method may further include comparing the object in the object cluster to a reference object and selectively associating object data of the reference object with all objects within the object cluster based on the comparing. The method may further include manually associating the object data of the reference object with all objects within the object cluster having no associated reference object and populating a reference database with the reference object for the object cluster.

25 Claims, 9 Drawing Sheets

OBJECT RECOGNITION AND DATABASE POPULATION FOR VIDEO INDEXING

This application claims the benefit of priority under 35 U.S.C. 119(e) to U.S. Provisional Patent Application Ser. No. 60/986,236, filed on Nov. 7, 2007, which is incorporated herein by reference.

FIELD

This application relates to a system and method for processing digital media.

BACKGROUND

Object detection and recognition in video content have proven to be difficult tasks in artificial intelligence.

BRIEF DESCRIPTION OF DRAWINGS

Embodiments are illustrated by way of example and not limitation in the figures of the accompanying drawings, in which like references indicate similar elements and in which.

DETAILED DESCRIPTION

The example embodiments described herein may be implemented in an operating environment comprising software installed on a computer, in hardware, or in a combination of software and hardware.

Disclosed herein is an efficient technique to detect objects in video clips and to identify the detected objects throughout the clips with minimal computing cost. The technique may be utilized to detect any category of objects (e.g., facial images), but the term "facial image" will be used throughout this description to provide a clearer explanation of how the technique may work. The detection of the facial images may use various algorithms described below. The detected facial images may be normalized according to various criteria, which facilitate organization of the facial mages images into clusters. Each cluster may contain facial images of one person, however, there may be more than one cluster created per one person because the confidence level of the system may not be high enough, at this point, to determine whether or not the facial images belong to the same person as the facial images in an existing cluster.

Once the facial images are organized into clusters, they may be compared to reference facial images. An increased efficiency is achieved by utilizing certain representative facial images from each cluster of facial images to compare to the reference facial images. The reference facial images may include facial images of people known to the system. If the system determines that the facial images in the cluster cannot be identified because there are no similar reference facial images, a manual identification may be performed.

Once the images are identified by comparison to the reference facial images, the cluster data pertaining to the identified images may be stored to a database and utilized to search the video clips from which the facial images are extracted. The stored data may include, among other things, the name of the person associated with the facial images, the times of appearances of the person in the video, and the location of the facial images in the video frames of the video clip. The data stored to the database may be utilized to search the video clips for people by keywords (e.g., Madonna). Data usage provides users with a better video viewing experience. For example, such data usage allows users to determine times in the video where the facial image associated with the keyword appears, and also to navigate through the video by the facial image appearances.

Figure 1:
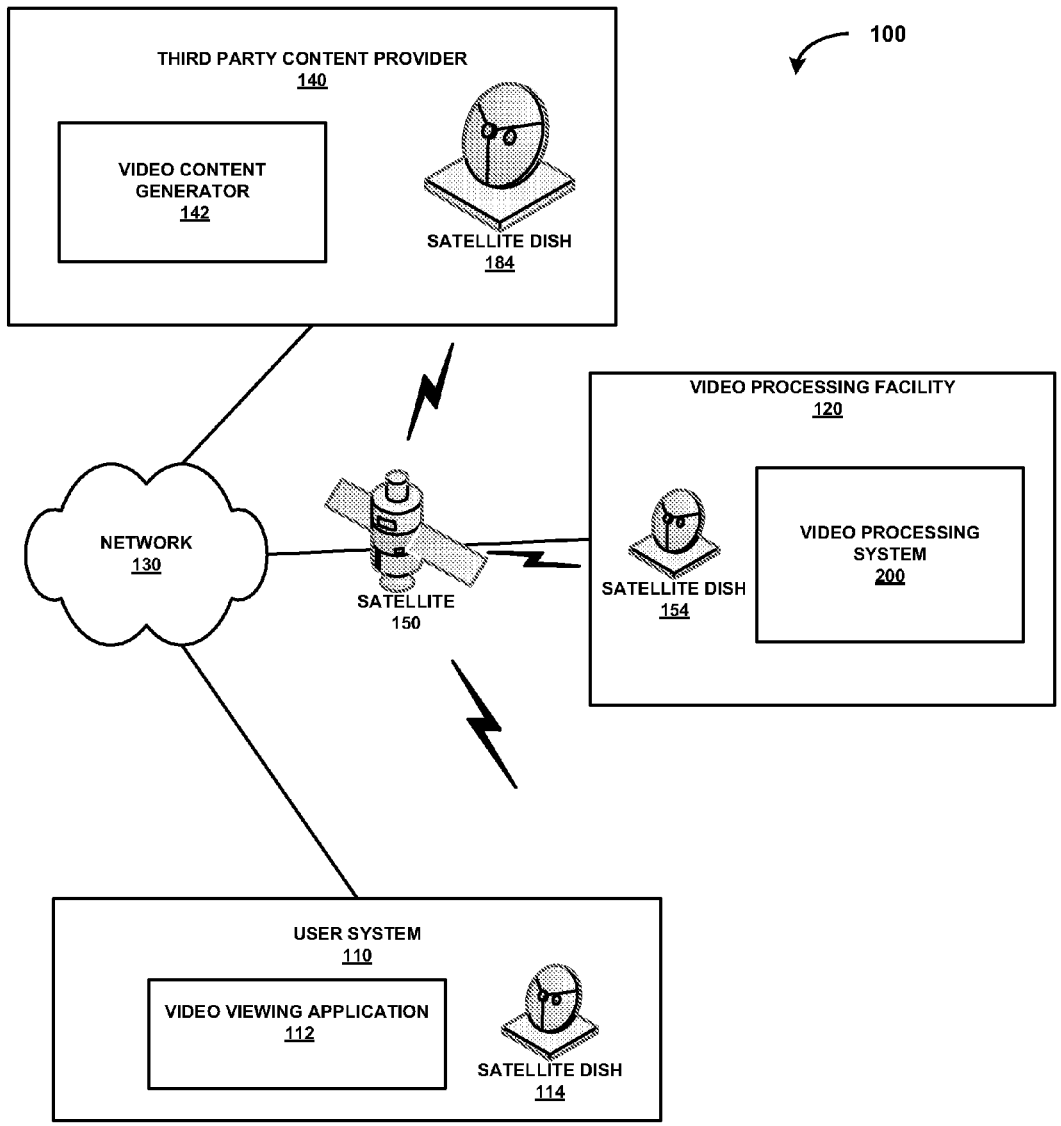
FIG. 1 is a block diagram showing architecture within which a method and system of object recognition and database population for video indexing are implemented, in accordance with an example embodiment.

FIG. 1 shows an example environment 100, within which a method and system of facial image recognition and database population for video indexing may be implemented. As shown in FIG. 1, the example environment 100 may comprise a user system 110, a video processing facility 120, a network 130, a third party content provider 140, and a satellite 150.

The user system 110 may further comprise a video viewing application 112 and a satellite dish 114. The user system 110 may be a general purpose computer, a television set (TV), a personal digital assistant (PDA), a mobile telephone, a wireless device, and any other device capable of visual presentation of images (including text) acquired, stored, or transmitted in various forms. The video viewing application 112 may be any application software that facilitates display of a video via the user system 110. The video viewing application 112 may run at or be distributed across the user system 110, third party content provider 140, and the video processing facility 120.

The satellite dish 114, in one example embodiment, is a type of antenna designed for the specific purpose of transmitting signals to and/or receiving signals from satellites. The satellite dish 114 may be of varying sizes and designs, and may be used to receive and transmit any type of digital data to and from a satellite. The satellite dish 114 may be located at the video processing facility 120. It should be noted that the satellite dish 114 is just one of many means to provide network connectivity, and other types of network connectivity may be used.

The video processing facility 120 may comprise a satellite dish 154 and a video processing system 200. The satellite dish 154 may be similar to the satellite dish 114 described above. The video processing facility 120 may represent fixed, mobile, or transportable structures, including installed electrical and electronic wiring, cabling, and equipment and supporting structures, such as utilities, ground networks, wireless networks, and electrical supporting structures. The video processing system 200 is described by a way of example with reference to FIG. 2.

The video processing system 200 may be a general-purpose computer processor or a type of processor designed specifically for the receiving, creation and distribution of digital media. The video processing system 200 may include various modules such as a facial image extraction module 204 that provides extraction of facial images, a facial image clustering module 206 that clusters the facial images, and a suggestion engine 208 that automatically identifies the facial images by comparing the facial images to reference facial images stored in a reference database. Further modules may include a manual labeling interface 214 for manual identification of the facial images and the index database (DB) 218 to store searchable indexes. An example embodiment of the facial image extraction module 204, including various modules is described by way of example with reference to FIG. 4 below. A method that may be used to process video utilizing the facial image extraction module 204 is described by way of example with reference to FIG. 5 below.

The facial image clustering module 206, utilized to cluster facial images extracted from the video, may reside at the video processing system 200. In some example embodiments, more than one cluster may be created per person. An example embodiment of the facial image clustering module 206 including various modules is described by way of example with reference to FIG. 5 below. A method that may be utilized to process video at the facial image clustering module 206 is described by a way of example with reference to FIG. 8 below.

The third party content provider 140 may comprise a digital media content generator 142 and a satellite dish 184. The third party content provider 140 may be an entity that owns or has the rights to digital media content such as digital videos. As an example, the third party content provider 140 may be a news service that provides reports to digital media broadcasters. The digital media content generator 142 may be a software application generating video content and transmitting the video content via the satellite dish 184 or the network 130, to be received at the video processing facility 120. The satellite dish 184 may be similar to the satellite dish 114 described above. The network 130 may be a network of data processing nodes that are interconnected for the purpose of data communication.

Figure 2:
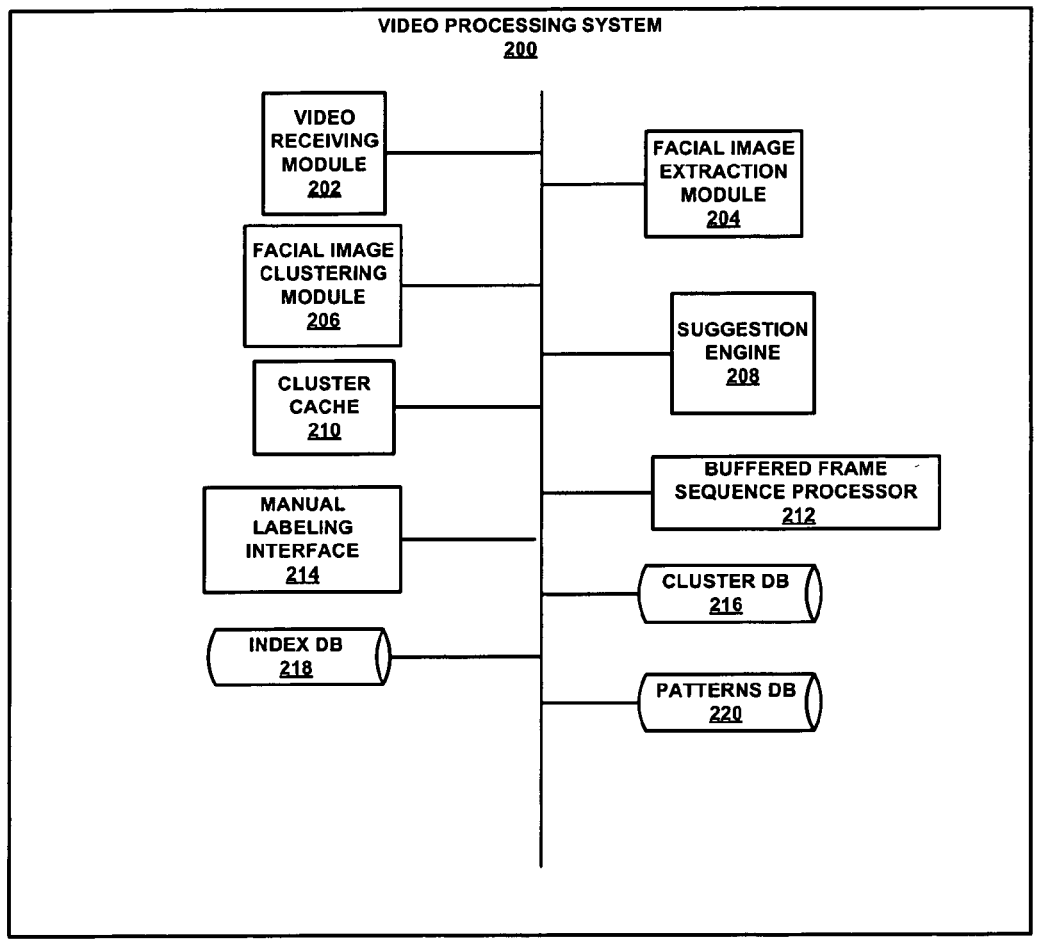
FIG. 2 is a block diagram of a video processing system, in accordance with an example embodiment.

As shown in FIG. 2, the video processing system 200 comprises a video receiving module 202, a facial image extraction module 204, a facial image clustering module 206, a suggestion engine 208, a cluster cache 210, a buffered frame sequence processor 212, a manual labeling interface 214, and a number of databases. The databases comprise a cluster database (DB) 216, an index DB 218, and a patterns DB 220.

The video receiving module 202, in an example embodiment, may be configured to receive video frames from the buffered frame sequence processor 212. In some example embodiments, there may be a specific number of frames received each time, for example, 15 frames. In some example embodiments, the video may be received in time intervals, for example, a one-minute interval.

Figure 5:
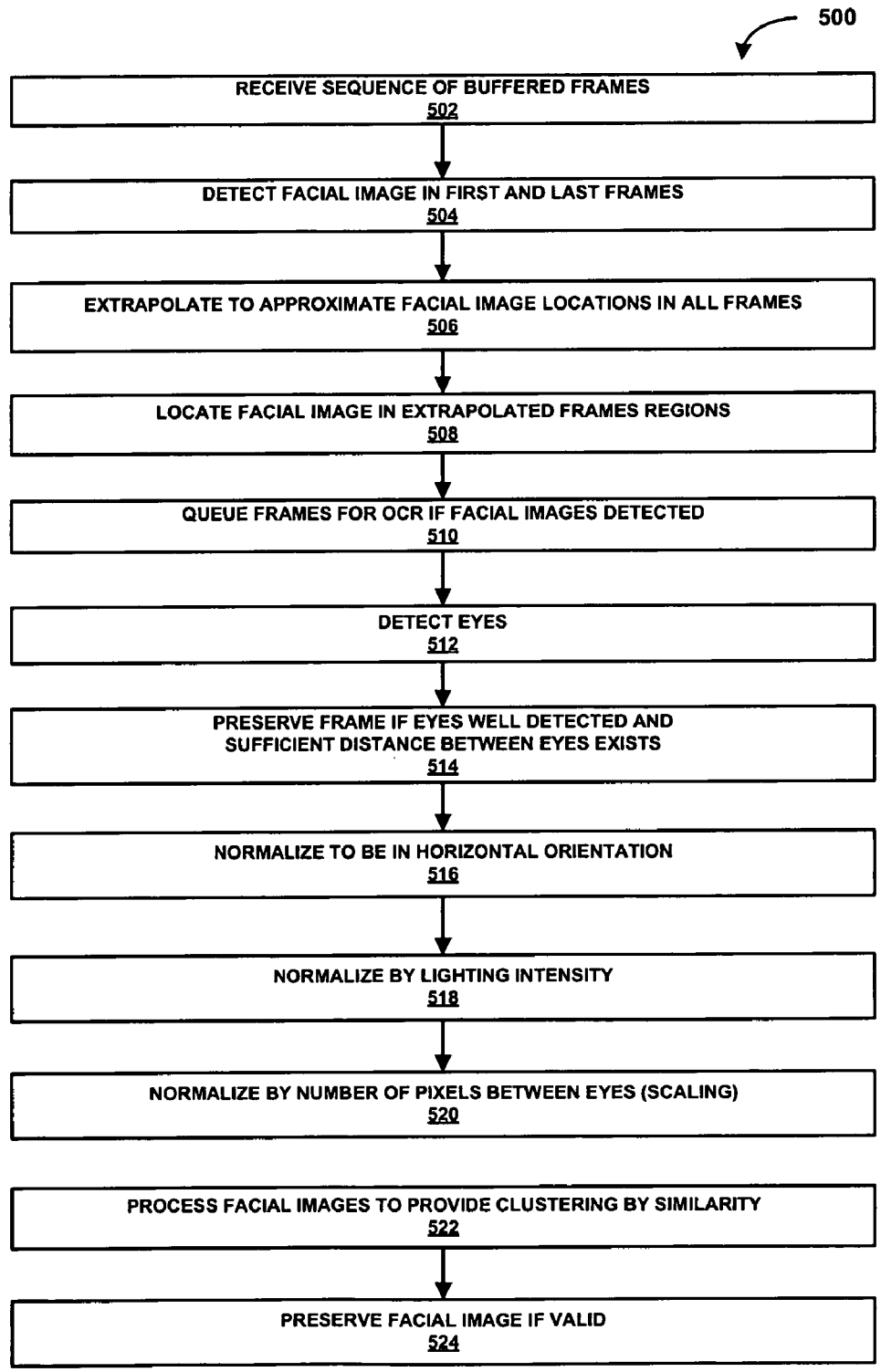
FIG. 5 is a flow chart of a method for video processing, in accordance with an example embodiment.

The facial image extraction module 204 may be configured to extract facial images from the video frames, which are received by the video receiving module 202 from the buffered frame sequence processor 212. Some frames may contain more than one facial image or no facial images at all. The facial image extraction module 204 may be configured to extract all facial images appearing in a single frame. If a frame does not contain any facial images, the frame may be dropped. The facial image extraction module 204, in some example embodiments, may normalize the extracted facial images, as shown in FIG. 5.

The facial image clustering module 206, in an example embodiment, may be configured to save the normalized facial images once they are extracted by the facial image extraction module 204. A method for clustering extracted images is described below by way of example with reference to method 700 of FIG. 7.

The suggestion engine 208, in an example embodiment, may be configured to label the normalized facial images with suggested identities of the person associated with the facial images in the cluster. In order to label the clusters, the suggestion engine 208 may compare the normalized facial images to reference facial images, and based on the comparison, may suggest the identity of the person associated with the facial image. The cluster cache 210, in an example embodiment, may be configured to store the clusters created by the facial image clustering module 206 until the clusters are labeled by the suggestion engine 208. Once the clusters are labeled in the cluster cache 210, they may be saved to the cluster DB 216.

The buffered frame sequence processor 212, in an example embodiment, may be configured to process video feeds received from the third party content provider 140. As an example, a video feed may be partitioned into video clips of certain time durations or into video clips having a certain number of frames. The processed video frames may be received by the facial image extraction module 204. The facial image extraction module 204, in an example embodiment, may be configured to process frames received from the buffered frame sequence processor 212 in order to detect facial images contained in the video frames. The facial image extraction module 204 may extract textual content of the video frames and save the textual content for further processing. Subsequently, the saved textual content may be processed to extract text that suggests the identity of the person appearing in the video.

The manual labeling interface 214, in an example embodiment, may be a graphical user interface configured to provide an operator with a facial image from the cluster cache 210, along with a set of reference facial images likely to be associated with the same person. The operator may visually compare and select, from the set of reference facial images, a facial image viewed as being associated with the same person as the facial image from the cluster cache 210.

The cluster DB 216, in an example embodiment, may be a database configured to store clusters of facial images and associated metadata extracted from the video feed. The facial images in the clusters stored in cluster DB 216 may be identified facial images. The metadata associated with the facial images in the clusters may be updated when previously unknown facial images in the cluster are identified. The cluster metadata may also be updated manually by comparing the cluster images to known reference facial images using the manual labeling interface 214. The index DB 218, in an example embodiment, may be a database populated with the indexed records of the identified facial images, each facial image's position in the video frame(s) in which it appears, and the number of times the facial image appears in the video. The relationship between various components of the video processing system 200 is described by way of example with reference to FIG. 3.

Figure 3:
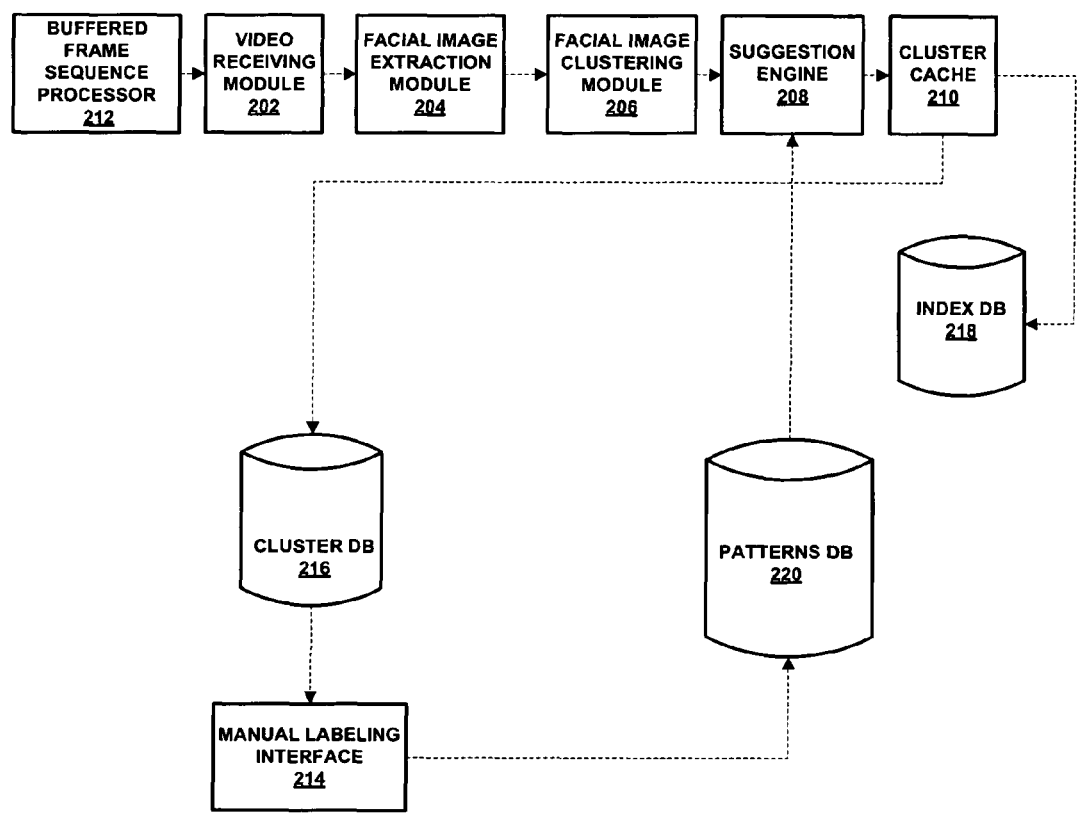
FIG. 3 is a block diagram showing interrelations between various components of the video processing system of FIG. 2, in accordance with an example embodiment.
Figure 4:
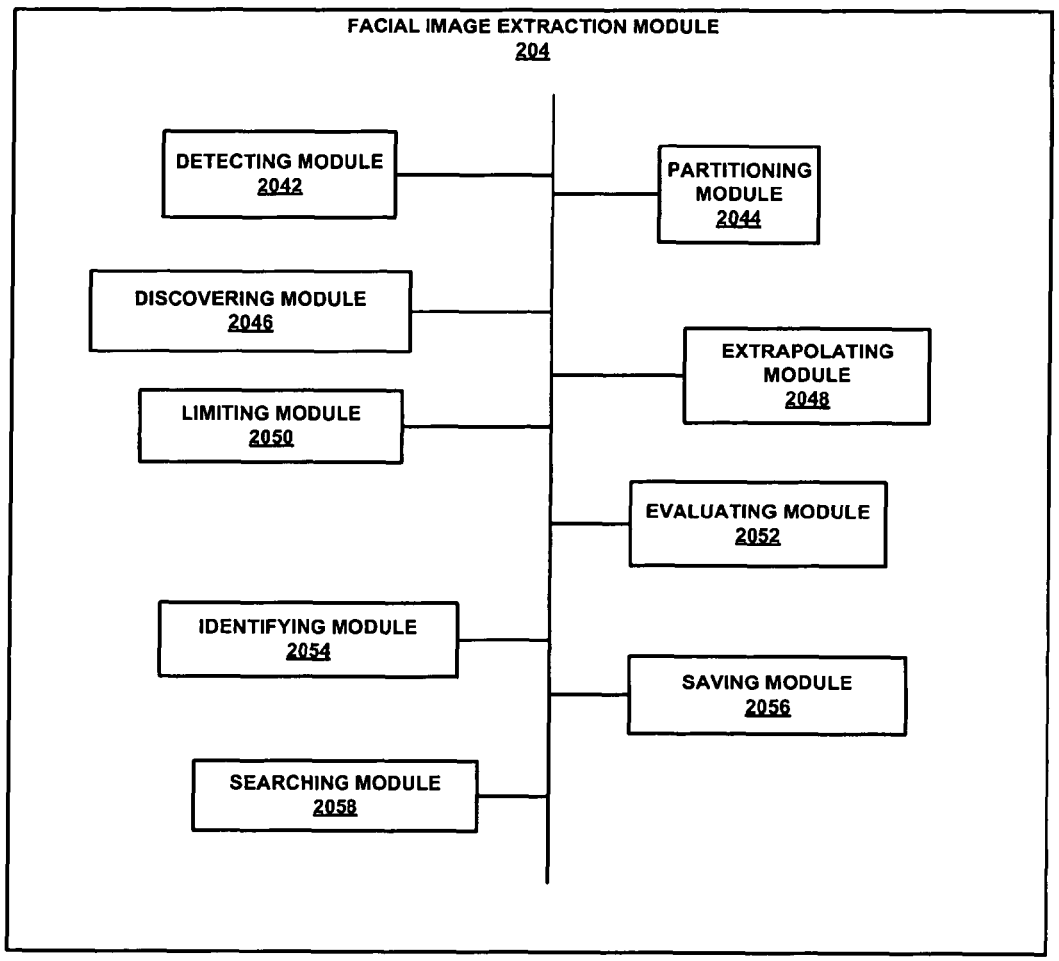
FIG. 4 is a block diagram of a facial image extraction module, in accordance with an example embodiment.

Referring to FIG. 4 of the drawings, the facial image extraction module 204 previously discussed in reference to FIGS. 2 and 3 is shown to include several components that may be configured to perform various operations. The facial image extraction module 204 may comprise a detecting module 2042, a partitioning module 2044, a discovering module 2046, an extrapolating module 2048, a limiting module 2050, an evaluating module 2052, an identifying module 2054, a saving module 2056, and a searching module 2058. Various operations performed by the components of the facial image extraction module 204 are described in greater detail by way of example with reference to method 500 of FIG. 5.

FIG. 5 is a flow diagram showing a method 500 for extracting a facial image, in accordance with an example embodiment. The method 500 may be performed by processing logic that may comprise hardware, software, or a combination of both. In one example embodiment, the processing logic resides at the facial image extraction module 204 illustrated in FIG. 2. The method 500 may be performed by the facial image extraction module 204 shown in FIG. 4. These modules may comprise processing logic.

Referring to both FIGS. 4 and 5, the method 500 commences with receiving a sequence of buffered frames at operation 502. In some example embodiments, as the frames are received at operation 502, they may be partitioned into groups of about 15 frames each by the partitioning module 2044. The detecting module 2042 may analyze the frames to determine whether a facial image is present in each frame. In some example embodiments, the detecting module 2042 samples frames without analyzing each frame individually, by detecting a scene change between frames. In some example embodiments, the first and the last frames of a frame subset may be analyzed for facial images and the analysis of intermediate frames may be performed only in areas close to where the facial images are found in the first and the last frames, as described in more detail below.

At operation 504, facial images in the first and the last frames may be detected by an existing face-detecting algorithm (e.g., AdaBoost). In some example embodiments, the facial images detected in these non-contiguous frames may be extrapolated. Thus, at operation 506, the extrapolating module 2048 may extrapolate across multiple frames positioned between the detected images and approximate positions of the facial images in the intermediary frames. Such an extrapolation may provide probable positions of a facial image in regions that are more likely to contain the facial image so that only these regions are scanned in order to detect the facial image. The regions that are less likely to contain the facial image, based on the approximation, may be excluded from face scanning to increase performance. At operation 508, the limiting module 2050 may limit scanning for facial images to extrapolated frame regions.

At operation 510, the discovering module 2046 may scan the frames containing detected facial images for the presence of textual content. The textual content may be helpful in identifying the person associated with the facial images. Accordingly, the facial images where textual content was detected may be queued to be processed by an optical character recognition (OCR) processor.

At operation 512, the detecting module 2042 may proceed to detect eyes in the frames in which a facial image was detected. Detection of eye positions may be performed in two stages. At the first stage, a quick pass may be performed by means of the AdaBoost algorithm (P. Viola and M. Jones, "Robust real-time object detection," In Proc. of IEEE Workshop on Statistical and Computational Theories of Vision, pp. 1-25, 2001) using information learned from a large pool of eye images. Then, a facial image position may be defined more precisely by detection of eye pupil centers using direct detection of eye pupils. The AdaBoost method may be used without having to first normalize the images to be in a frontal orientation. The methods used for a more precise pass may be based on direct detection of eye pupils and may be limited to detection of open eyes in frontally oriented facial images.

A determination may be made to preserve the frames if the distance between the eyes is greater than a predetermined threshold distance. For example, faces with the distance between eyes of less than 40 pixels may be suppressed and not used when identifying the facial image. At operation 514, the evaluating module 2052 may evaluate the normalized facial image to determine whether eyes are well detected and whether sufficient distance between eyes exists. If the evaluating module 2052 determines that the eyes are well detected and that sufficient distance exists between the eyes, the facial images may be preserved. If, on the other hand, the evaluating module 2052 determines that the eyes are not well detected or that sufficient distance does not exist between the eyes, the facial images may be discarded.

At operation 516, the facial images may be normalized to position eyes in a horizontal orientation. At operation 518, the images may be normalized by light intensity, and at operation 520, the images may be normalized by size so that the eye centers in the facial image are located within a certain number of pixels from each other. During the normalization, every image may be enlarged or reduced so that all images are of the same size (e.g., 104 by 104 pixels), thus ensuring a certain number of pixels between the eyes. It should be noted that even though the procedure described herein is specific to a human face, a person skilled in the art will understand that similar normalization procedures may be utilized to normalize images of any other object categories such as, for example, cars, buildings, animals, and helicopters. Furthermore, it should be noted that the face detection techniques described herein may also be utilized to detect other categories of objects.

At operation 522, the facial images are processed to provide clustering by similarity. The normalized facial images may be clustered in a cluster cache 210 (FIG. 3). Each facial image is added to an existing cluster if the facial image is similar to the facial images already present in the cluster. This typically may result in facial images associated with a certain person being stored to one or a few clusters. To determine whether the facial image belongs to a previously created cluster, the distance between the facial image and the already clustered facial images is measured. If the distance is below a predetermined threshold, the facial image is assumed to belong to the same cluster and, accordingly, may be added to the same cluster.

In some example embodiments, if the distance is below a predetermined threshold, there may be no additional value in saving almost identical facial images in the cluster cache and, correspondingly, the facial image may be dropped. If, on the other hand, the difference between the facial images in the previously created cluster and the newly normalized facial image is greater than a predetermined threshold, the newly normalized image may belong to a different person, and accordingly, a new cluster may be started. In some example embodiments, there may be more than one cluster created for the facial images of a single person. As already mentioned above, when clusters increase in size, a distance between the facial images of the clusters may decrease below a predetermined threshold. This may indicate that such clusters belong to the same person and, accordingly, such clusters may be merged into a single cluster using the merging module 2074 (described below with respect to FIG. 6).

Referring now to FIGS. 2, 3, and 5, each cluster in the cluster cache 210 may be labeled by the suggestion engine 208 with a list of probable person identities based on the facial images contained in the clusters. Confidence levels corresponding to each probable person identity may be assigned to the clusters and their facial images resulting from identification of the normalized facial images of the cluster by comparing the clusters to the patterns DB 220. The identification of the normalized facial images is based on calculation of distances from the facial image to every reference image in the patterns DB 220. The clusters in the cluster cache 210 may be saved to cluster DB 216 along with labels, face sizes, and screenshots after the facial images in the clusters are identified. Cluster cache information may be used for automatic or manual decision making as to which person facial images of the cluster belong to. Once the decision is made, the cluster cache may be utilized to create an index, saving it to the index DB 218 at operation 524. The index db 218 may provide searching capabilities to users searching the videos for facial images identified in the index database.

Figure 6:
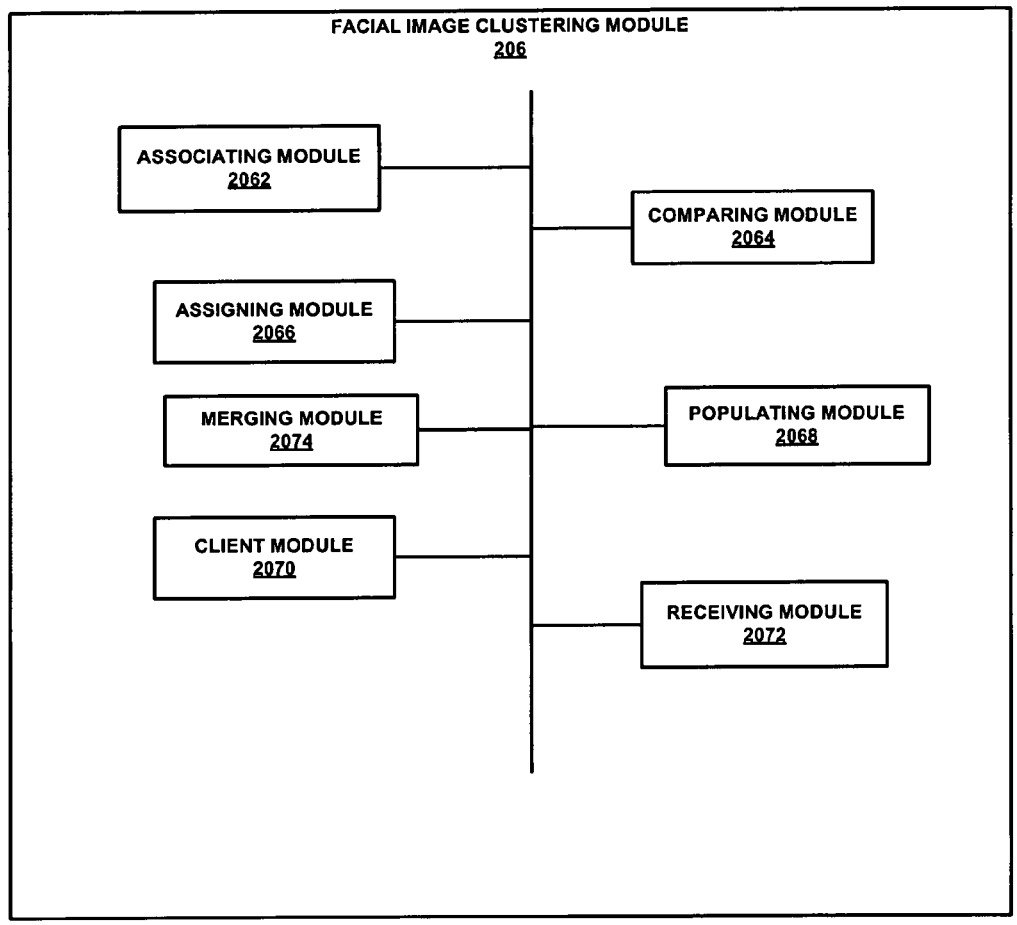
FIG. 6 is a block diagram of a facial image clustering module, in accordance with an example embodiment.

Referring to FIG. 6 of the drawings, the facial image clustering module 206 is shown to include several components that may be configured to perform various operations. The facial image clustering module 206 may comprise an associating module 2062, a comparing module 2064, an assigning module 2066, a populating module 2068, a client module 2070, a receiving module 2072, and a merging module 2074. Various operations performed by the facial image clustering module 206 are described by way of example with reference to method 700 of FIG. 7.

Figure 7:
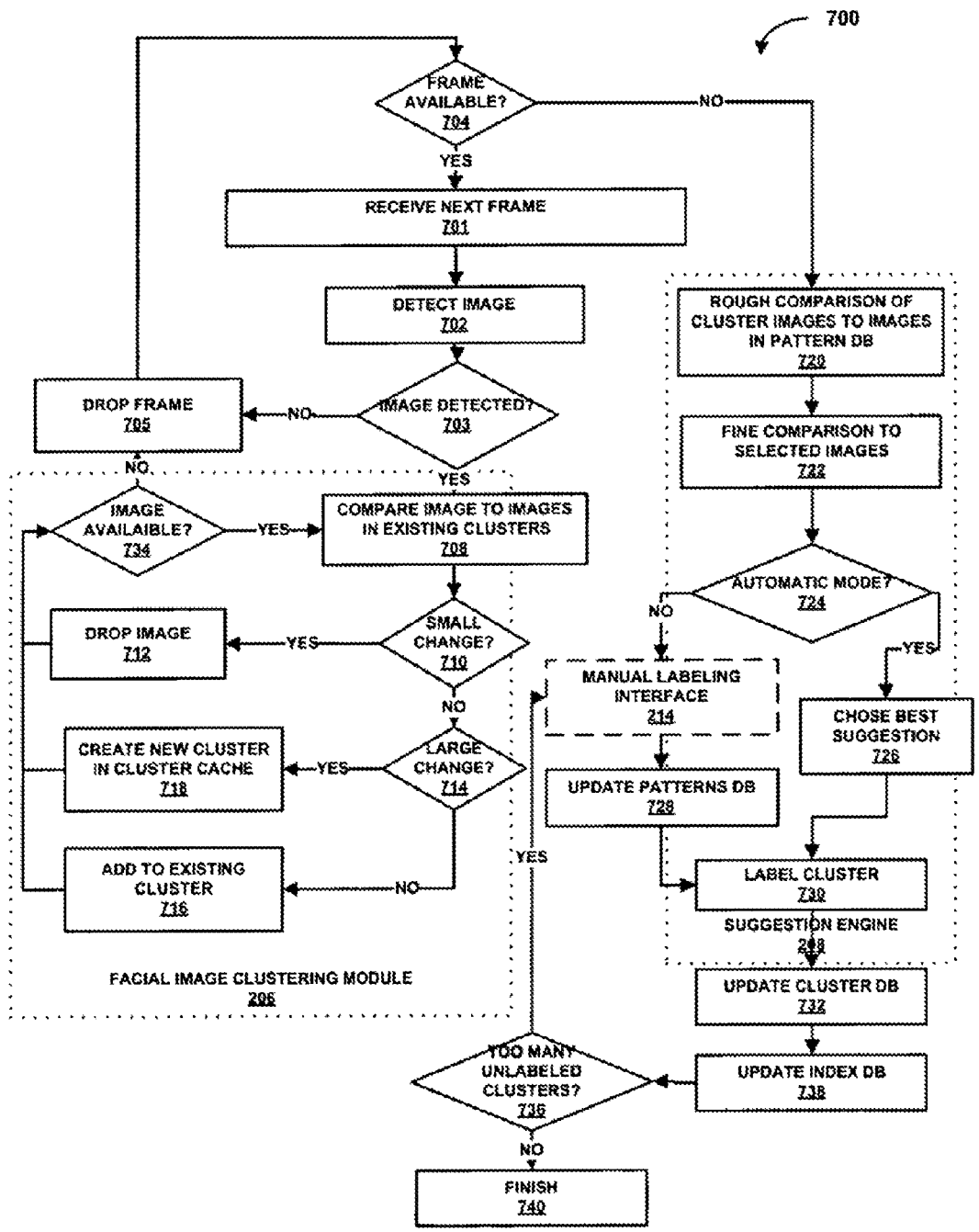
FIG. 7 is a flow chart of a method for facial image clustering, in accordance with an example embodiment.

FIG. 7 is a flow diagram showing a method 700 for clustering facial images, in accordance with one example embodiment. The method 700 may be performed by processing logic that may comprise hardware (e.g., dedicated logic, programmable logic, microcode, etc.), software (such as that which is run on a general purpose computer system or a dedicated machine), or a combination of both. In one example embodiment, the processing logic resides at the video processing system 200 illustrated in FIG. 2. The method 700 may be performed by the various modules discussed above with reference to FIG. 6. These modules may comprise processing logic.

Referring to both FIGS. 6 and 7, method 700 commences with receiving the next video frame from the video receiving module 202. Until all frames are received, the clustering process may be performed in the facial image clustering module 206. When all frames are received and the clusters are formed, the suggestion process may be started by the suggestion engine 208. Operations of both modules are described in more detail below. Thus, when a video frame is received 701, it may be followed by detecting a facial image at operation 702. This method of detecting a facial image is described in more detail above with reference to method 500 of FIG. 5. At decision block 703, it may be determined whether or not a facial image was detected in the frame. If no facial image was detected at operation 702, the frame may be dropped 705. If, on the contrary, a facial image was detected, the comparing module 2064 compares the detected facial image to the facial images in existing clusters at operation 708. In some example embodiments, the clusters may initially be stored in cluster cache 210. Once the clusters are formed, they may be saved to the cluster DB 216. Clusters may have other metadata associated with them besides images. For example, the metadata may be text obtained from audio associated with the facial images in the cluster, or text obtained from visual content of the video frames from which the facial images were extracted. The metadata may also include other information obtained from the video and other accompanying digital media near the point where the facial images in the cluster were extracted.

At decision block 710, the comparing module 2064 compares the facial image to the facial images in the existing clusters in the cluster cache 210 and determines whether the distance between the facial image and the facial images in the existing clusters is less than a first predetermined threshold. If the distance is less than the first predetermined threshold (e.g., there is a small change), it may indicate that the facial images are very similar and that there is no benefit in saving both facial images to the cluster cache. Accordingly, the facial image may be dropped at operation 712. If the distance between the facial image and the facial images in the existing clusters is more than the first predetermined threshold but less than a second, larger predetermined threshold, a decision may be made at decision block 714 that the facial image is associated with the same person as facial images in an existing cluster, and also that there is value in adding the facial image to the existing cluster due to the difference between the facial image and the facial images in the existing cluster. Accordingly, the facial image may be added to an existing cluster at operation 716.

If the distance between the facial image and the facial images in the existing cluster is above the second, larger predetermined threshold (i.e., there is a large change), the distance may indicate that the facial images are not associated with the same person. Accordingly, at operation 718 a new cluster may be created. During the addition of a facial image to an existing cluster, it may be determined that the facial image may be added to more than one cluster. This may typically indicate that the two clusters belong to the same person and such clusters may then be merged into a single cluster by the merging module 2074. After a facial image is added to a cluster, at operation 734 the next detected facial image in the video frame is fetched. If no more facial images are available in the video frame, operation 705 drops the frame and operation 704 determines if another video frame is available for processing.

If no more frames are available, at operation 704, the suggestion process starts. Thus, at operation 720 a rough comparison by the comparing module 2064 may be performed to compare the facial images in the cluster to the reference facial images in the patterns DB 220. In some example embodiments, the reference facial images in the patterns DB 220 may be high definition images. The rough comparison may be performed in order to quickly identify a set of possible reference facial images and exclude unlikely reference facial images from the slower, fine-pass identification. Thus, the rough comparison is intended to pre-select the reference facial images in the database. At operation 722, a fine comparison to the reference facial images pre-selected in the initial rough comparison may be performed. This fine comparison may allow one or very few reference facial images from the pre-selected set to be identified as being associated with the same person as the facial image from the cluster.

At block 724, depending on a mode of the identification, the method 700 flow proceeds to either the manual or the automatic branch. At operation 726, the automatic branch utilizes suggestions made by a suggestion module. The comparing module 2064 may determine whether an acceptable suggestion is made based on the distance from the cluster facial image to the reference facial image associated at operation 722. If, at operation 726, the decision is made that the suggestion made by the comparing module 2064 is acceptable, the method 700 may proceed to operation 730 and may label the cluster with metadata identifying the cluster as being associated with a certain person. In some example embodiments, there may be a list containing a predetermined number of suggestions generated for every facial image. In some example embodiments, there may be more than one suggestion method utilized based on different recognition technologies. For example, there may be several different algorithms performing recognition, and each algorithm will provide the comparing module 2064 with a distance between the facial image in the cluster and the reference facial images in the patterns DB 220. The precision with which the facial image in the cluster cache is identified may depend on the size of the patterns DB 220. With increasing amounts of reference data stored to the patterns DB 220, the automatic recognition yields more precise identification results.

If, on the contrary, at operation 724, the execution of the method 700 precedes to the manual branch, at operation 214 an operator may be provided with the facial image for a manual identification. For example, the cluster DB 216 may be empty and accordingly there will be no suggestions generated, or the confidence level of the available suggestions may be insufficient as in a case of the cluster DB 216 being only partially populated with reference data. Thus, an operator may have to identify the clusters manually.

To perform the manual identification, the operator may utilize the client module 2070. The operator may be provided with the reference facial images that are the closest matches to the facial image. For example, the operator may be provided with several reference facial images which are not within the predetermined threshold of the facial image but, nevertheless, are sufficiently close to be likely candidates for the manual comparison. In some example embodiments, the operator may be supplied with information extracted from the video stream, which may be helpful in identification of the facial image. For example, names extracted from textual content of frames using OCR, persons' names from subtitles, names extracted using speech-to-text, electronic program guide, or a transcript of the video file may be supplied to the operator to increase the likelihood of correct identification. Thus, at operation 728, the operator may visually identify the facial image and update patterns DB 220 with a new reference facial image if the operator decides that no matching reference facial image exists in the patterns DB 220.

Once patterns DB 220 is updated with a new reference facial image, the operator may either manually update the cluster cache 210 with the identifying information or may instruct the facial image clustering module 206 to repeat the rough comparison step. If, on the other hand, the operator identifies the facial image based on the comparison to the reference facial images from the database, the operator may proceed to label the cluster manually at operation 730. After the cluster is labeled with the identifying data, at operation 732, the cluster (currently in the cluster cache 210) may be saved to cluster DB 216 by the populating module 2068. Based on the cluster DB 216, searchable information in the index DB 218 is created at operation 738. The index information stored in the index DB 218 may contain metadata related to the object identity, its location in the video stream, time of its every appearance, and spatial location in the frames. Other relevant information useful for viewing application may be stored in the index DB 218. If, after an automatic labeling, it is determined that too many clusters remain unlabeled with metadata at operation 736, then manual verification may be performed at module 214. If, on the contrary, it is determined that no manual verification is to be performed, the video metadata extraction is completed at operation 740.

Figure 8:
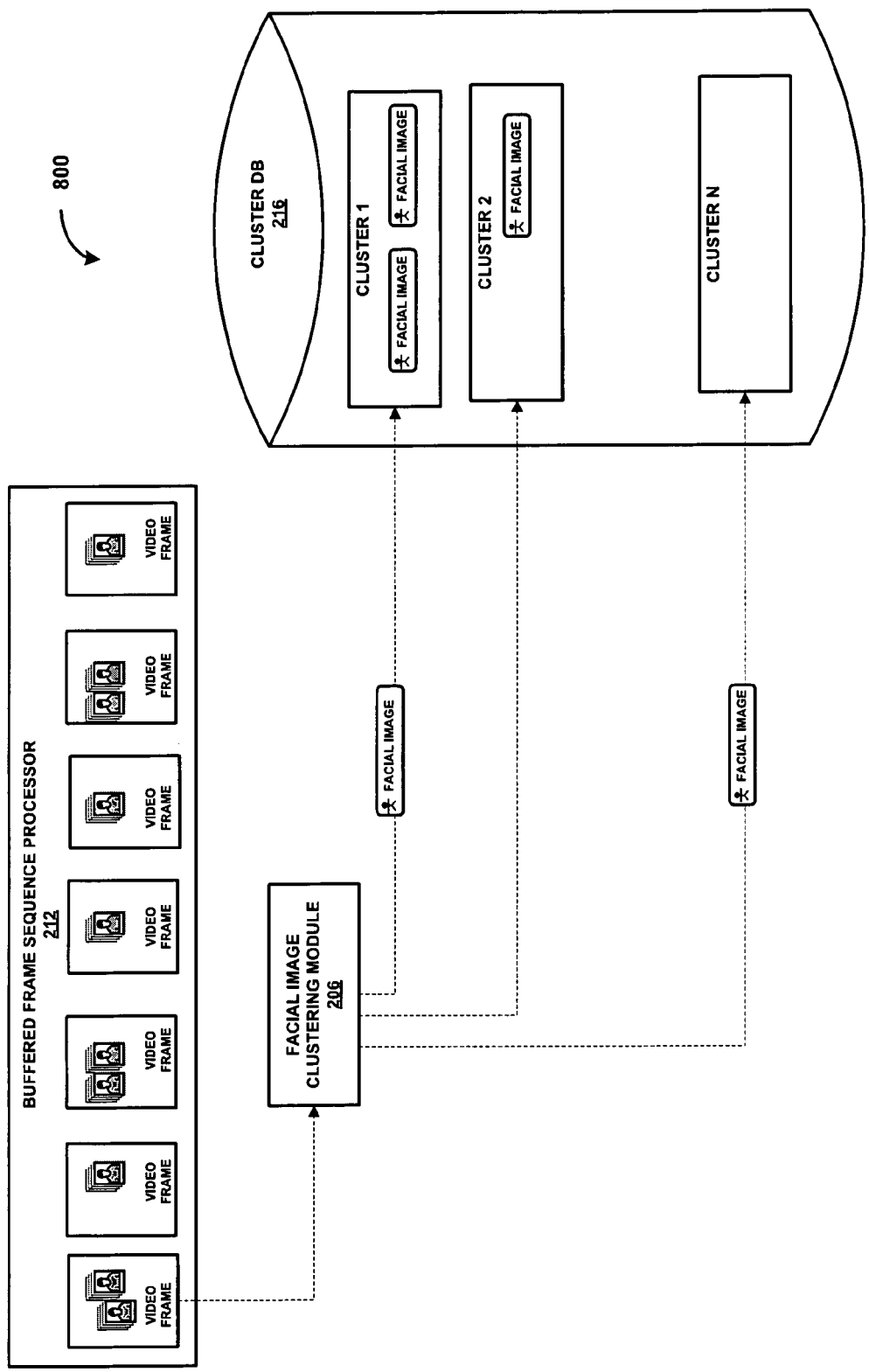
FIG. 8 is a block diagram of an environment within which a facial image clustering module is implemented, in accordance with an example embodiment.

Referring to FIG. 8 of the drawings, facial image clustering module environment 800 is shown to include several components that may be configured to perform various operations. The facial image clustering module environment 800 illustrates how the buffered frame sequence processor 212, the facial image clustering module 206, and the cluster DB 216 may interact. The buffered frame sequence processor 212 may comprise video frames, each video frame extracted and analyzed for presence of facial images as described above with reference to example method 500 in FIG. 5. The facial image clustering module 206 is discussed above with reference to FIG. 6.

Figure 9:
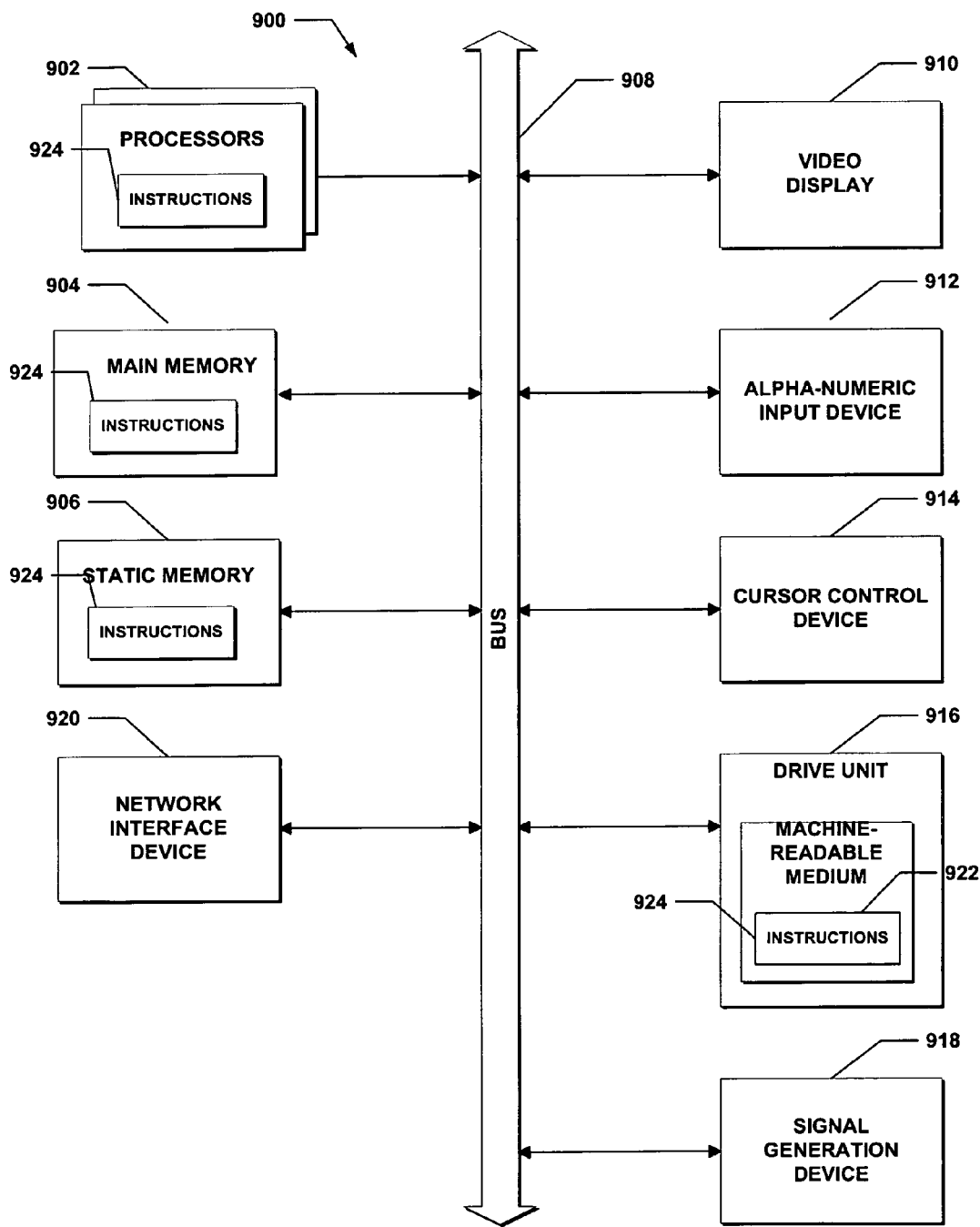
FIG. 9 is a diagrammatic representation of an example machine, in the form of a computer system, within which a set of instructions for causing the machine to perform any one or more of the methodologies discussed herein is executed.

FIG. 9 shows a diagrammatic representation of a machine in the example form of a computer system 900, within which a set of instructions for causing the machine to perform any one or more of the methodologies discussed herein may be executed. In various example embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker), and a network interface device 920.

The drive unit 916 includes a machine-readable medium 922 on which is stored one or more sets of instructions and data structures (e.g., instructions 924) embodying or utilized by any one or more of the methodologies or functions described herein. The instructions 924 may also reside, completely or at least partially, within the main memory 904 and/or within the processor 902 during execution thereof by the computer system 900. The main memory 904 and the processor 902 also constitute machine-readable media.

The instructions 924 may further be transmitted or received over a network 926 via the network interface device 920 utilizing any one of a number of well-known transfer protocols (e.g., Hyper Text Transfer Protocol (HTTP)).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a method and system of object recognition and database population for video indexing have been described. Although embodiments have been described with reference to specific example embodiments, it will be evident that various modifications and changes may be made to these example embodiments without departing from the broader spirit and scope of the present application. Accordingly, the specification and drawings are to be regarded in an illustrative rather than a restrictive sense.

The invention claimed is:

1. A method of processing a video stream including a plurality of video frames, the method comprising:
   detecting appearances of a person in one or more of the plurality of video frames in the video stream;
   responsive to detecting an appearance of the person in a video frame:
     extracting an image of the person from the video frame;
     identifying first metadata from at least one of a video frame or audio track associated with the plurality of video frames; and
     associating the first metadata with the image of the person;
   determining a distance between the extracted image and at least one image from an object cluster;
   associating the image with the object cluster responsive to the distance, the object cluster comprising images of the person;
   comparing at least one image from the object cluster to a reference image of a known person;
   determining whether the image from the object cluster is of the known person based on the comparison; and
   associating second metadata with the object cluster, the second metadata identifying the object cluster as comprising images of the known person.

2. The method of claim 1, wherein determining whether the image from the object cluster is of the known person and associating the metadata with the object cluster is performed automatically.

3. The method of claim 1, wherein determining whether the image from the object cluster is of the known person is performed manually.

4. The method of claim 2, wherein comparing the at least one image from the object cluster to a reference image comprises comparing the image with a plurality of reference images from a database of reference objects.

5. The method of claim 1, wherein comparing the at least one image from the object cluster to a reference image comprises:
   providing the at least one image from the object cluster to a user interface;
   providing the reference image to the user interface; and
   receiving a user input indicating that a user views the image from the object cluster as being associated with the known person.

6. The method of claim 1, wherein detecting appearances of the person comprises:
   partitioning the video stream into a plurality of frame groups;
   detecting a facial image of the person in a first frame and a last frame of a frame group;
   in each of one or more video frames that fall between the first frame and the last frame in the frame group, extrapolating approximate regions in which the a facial image of the person is likely to be located; and
   limiting the detecting of facial images to the approximate regions.

7. The method of claim 1, wherein the comparing the at least one image from the object cluster to a reference image of a known person comprises:
   performing a first action that compares the image from the object cluster with a bigger set of reference images, producing a smaller set of reference images with an increased likelihood of identifying the image from the cluster as an image of a known person; and
   performing a second action that compares the image from the cluster with the smaller set of reference images.

8. The method of claim 1, wherein the reference image is selected from a collection of high-resolution facial images.

9. The method of claim 1, wherein the extracted image is associated with the object cluster when a distance between a vector representing the extracted image and an image from the object cluster is above a first predetermined threshold but below a second predetermined threshold.

10. The method of claim 1, the method further comprising creating a new object cluster when a distance between a vector representing the extracted image and images from any object cluster is greater than a predetermined threshold and associating the extracted image with the new object cluster.

11. The method of claim 1, wherein the object cluster is an object folder, the method further comprising saving the extracted image and the metadata to files in the object folder.

12. The method of claim 1, wherein the images are facial images and the method further comprises one or more of normalizing facial images to represent a horizontal orientation of the facial images, normalizing an intensity of lighting, normalizing distance between eyes of the facial images, or normalizing a size of the facial images.

13. The method of claim 1, the method further comprising selecting images in which a distance between eyes in a normalized facial image is not less than 40 pixels.

14. The method of claim 1, further comprising:
   comparing images of the person in subsequent video frames; and
   using data derived from appearances of the person in one frame to identify an object or properties of the object in another frame.

15. The method of claim 1, further comprising:
   for an appearance of the person in a video frame in the video stream, saving to an index database at least one of the following: a time of the appearance, duration of the appearance based on the appearance of the person in subsequent video frames, and spatial location of the image of the person within the video frame; and
   providing searching capabilities within the index database to display the video stream starting from the appearance of the person in the video frame in the video stream.

16. A system for processing a video stream including a plurality of video frames, the system comprising:
   a non-transitory computer-readable storage medium storing executable computer program instructions that when executed by one or more processors cause the processors to:
     detect appearances of a person in one or more of the plurality of video frames in the video stream;
     responsive to detecting an appearance of the person in a video frame:
       extract an image of the person from the video frame;

identify first metadata from at least one of a video frame or audio track associated with the plurality of video frames; and
associate the first metadata with the image of the person;
determine a distance between the extracted image and at least one image from an object cluster;
associate the extracted facial image with the object cluster responsive to the distance, the object cluster comprising images of the person;
compare at least one image from the object cluster to a reference image of a known person;
determine whether the image from the object cluster is of the known person based on the comparison; and
associate second metadata with the object cluster, the second metadata identifying the object cluster as comprising images of the known person.

17. The system of claim 16, further comprising instructions causing the processors to populate a reference database with a reference image from every object cluster having associated metadata identifying the object cluster as comprising images of a known person.

18. The system of claim 16, wherein the comparing module is to compare the at least one object to the at least one reference object from a database of reference objects.

19. The system of claim 16, wherein comparing the at least one image from the object cluster to a reference image comprises:
providing the at least one image from the object cluster to a user interface;
providing the reference images to the user interface; and
receiving module a user input indicating that a user views the image from the object cluster as being associated with the known person.

20. The system of claim 16, wherein detecting appearances of the person comprises:
partitioning the video stream into a plurality of frame groups;
detecting a facial image of the person in a first frame and a last frame of a frame group;
extrapolating approximate regions in one or more video frames in the frame group between the first frame and the last frame in which the facial image of the person is likely to be located; and
limiting the detecting of facial images to the approximate regions.

21. The system of claim 16, wherein the extracted image is associated with the object cluster when a distance between a vector representing the extracted image and a image from the object cluster is above a first predetermined threshold but below a second predetermined threshold.

22. The system of claim 16, further comprising instructions causing the processors to:
compare images of the person in subsequent frames; and
use data derived from appearances of the person in one face to identify an object or properties of the object in another frame.

23. The system of claim 16, further comprising instructions causing the processors to:
for an appearance of the person in a video frame in the video stream, save to an index database one or more of the following: a time of the appearance, duration of the appearance based on the appearance of the person in subsequent video frames, and spatial location of the image of the person within the video frame; and
provide searching capabilities within the index database to display the video stream starting from the appearance of the person in the video frame in the video stream.

24. A method to process a video stream including a plurality of video frames, the method comprising:
means for detecting appearances of a person in one or more of the plurality of video frames in the video stream, and responsive to detecting an appearance of the person in a video frame:
extracting an image of the person from the video frame;
identifying first metadata from at least one of a video frame or audio track associated with the plurality of video frames; and
associating the first metadata with the image of the person;
means for determining a distance between the extracted image and at least one image from an object cluster;
means for associating the extracted facial image with the object cluster responsive to the distance, the object cluster comprising images of the person;
means for comparing at least one image from the object cluster to a reference image of a known person, and determining whether the image from the object cluster is of the known person based on the comparison; and
means for associating second metadata with the object cluster, the second metadata identifying the object cluster as comprising images of the known person.

25. A non-transitory computer-readable storage medium storing executable computer program instructions that when executed by one or more processors cause the processors to:
detect appearances of a person in one or more of the plurality of video frames in the video stream;
responsive to detecting an appearance of the person in a video frame:
extract an image of the person from the video frame;
identify first metadata from at least one of a video frame or audio track associated with the plurality of video frames; and
associate the first metadata with the image of the person;
determine a distance between the extracted image and at least one image from an object cluster;
associate the extracted facial image with the object cluster responsive to the distance, the object cluster comprising images of the person;
compare at least one image from the object cluster to a reference image of a known person;
determine whether the image from the object cluster is of the known person based on the comparison; and
associate second metadata with the object cluster, the second metadata identifying the object cluster as comprising images of the known person.

* * * * *